3,033,748
16-OXY-PREGNANES
Albert Wettstein, Basel, Robert Neher, Binningen, Pierre-Antoine De Saulles, Oberwil, and Ernst Vischer and Peter Wieland, Basel, Switzerland, assignors to Ciba Pharmaceutical Products Inc., Summit, N.J., No Drawing. Filed Dec. 17, 1958, Ser. No. 780,918
Claims priority, application Switzerland Sept. 14, 1956
7 Claims. (Cl. 167—65)

This is a continuation-in-part of our copending application Serial No. 683,979, filed September 16, 1957, which describes the manufacture of a new active principle, capable of causing the elimination of sodium, from suprarenal glands. Our copending application Serial No. 780,950, filed on even date herewith, describes new esters of said new active principle.

The present invention is based on the observation that this active principle is accessible synthetically by preparing in per se conventional manner allopregnane-3β:16α-diol-20-on which is the 5α-isomer of pregnane-3β:16α-diol-20-on. In this manner the constitution of this new active principle has been established. The 5β-isomer, i.e. pregnane-3β:16α-diol-20-on has also been found capable of causing the elimination of sodium.

Thus, the present invention relates to the synthesis of this new active principle and its 5β-isomer, that is to say, of these pregnane-3β:16α-diol-20-ons and of their substitution products of the formula

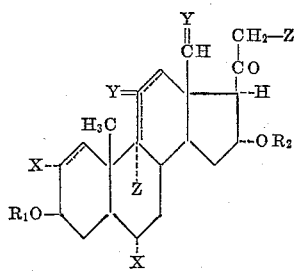

in which X represents hydrogen or a methyl group; Y two hydrogen atoms, a free, esterified or etherified hydroxyl group and a hydrogen atom, or an oxo group; Z represents hydrogen or halogen, and $R_1$ and $R_2$ hydrogen or an acyl or ether radical—which products may contain a double bond in the 1:2- and/or 9:11- or 11:12-position.

The ester radicals in the afore-mentioned substitution products or unsaturated derivatives of pregnane-3β:16α-diol-20-ons are, for example, those of saturated or unsaturated aliphatic or cycloaliphatic, aromatic or heterocyclic carboxylic acids, for example of fatty acids, particularly lower fatty acids, such as formic acid, acetic acid, propionic acid, butyric acids, lactic acid, valeric acids, such as n-valeric acid or trimethylacetic acid, diethylacetic acid, caproic acids, such as β-trimethyl-propionic acid, oenanthic acids, caprylic acids, pelargonic acids, capric acids, undecylenic acid, lauric acid, myristic acid, palmitic acid or stearic acid, oleic acid, crotonic acid, undecanic acid; halogenated fatty acids, particularly halongenated lower fatty acids, such as chloracetic acid, trifluoroacetic acid, trichloroacetic acid; carbamic acids, such as N-alkyl, especially N-lower alkyl carbamic acids, for example, N-methyl carbamic acid, N-ethyl carbamic acid, also N-aryl (especially monocyclic aryl) carbamic acids, for example N-phenyl carbamic acid etc.; cycloaliphatic (especially those containing 5 or 6 carbon atoms in the cyclic nucleus) carboxylic acids, such as cyclohexyl carboxylic acid, cyclohexenyl carboxylic acid, cyclopentyl carboxylic acid; lower aliphatic-cycloaliphatic (especially those containing 5 or 6 carbon atoms in the cyclic nucleus) carboxylic acids, such as cyclopentyl acetic acid, cyclohexyl acetic acid, cyclopentyl propionic acid, cyclohexyl propionic acid, cyclohexenyl propionic acid; benzoic acid and corresponding substituted acids, such as p-amino-benzoic acid, chloro-benzoic acids; aryl substituted fatty acids (especially lower fatty acids substituted by monocyclic aryl residues) such as phenyl acetic acid, phenyl propionic acid, phenyl butyric acid, tolyl propionic acid etc.; phenoxyalkanoic acids (especially lower alkanoic), such as phenoxyacetic acid, 4-tertiary butyl-phenoxyacetic acid, 3-phenoxy-propionic acid, 4-phenoxy-butyric acid, halo-substituted phenoxy alkanoic acids, such as para-chlorophenoxyacetic acid, 2:4-dichlorophenoxyacetic acid, furane-2-carboxylic acid, lower alkyl substituted furane-2-carboxylic acids, such as 5-tertiary butyl-furane-2-carboxylic acid, halo-substituted furane-2-carboxylic acids, such as 5-bromo- (or -chloro) furane-2-carboxylic acid, and N-heterocyclic carboxylic acids, such as nicotinic acid and isonicotinic acid; aliphatic, aromatic or cycloaliphatic dicarboxylic acids, such as oxalic acid, succinic acid, maleic acid, glutaric acid, dimethyl-glutaric acid, pimelic acid, acetone-dicarboxylic acid, phthalic acid, tetrahydrophthalic acid, hexahydrophthalic acid, endomethylene-tetrahydrophthalic acid, endomethylene-hexahydrophthalic acid, endoxy-hexahydrophthalic acid, endoxy-tetrahydrophthalic acid, camphoric acid, cyclopropane-dicarboxylic acid, cyclobutane-dicarboxylic acid, diglycolic acid, ethylene-bisglycolic acid, polyethylene-bisglycolic acid, quinolinic acid, cinchomeronic acid, furane-dicarboxylic acid, dihydro- and tetrahydrofurane-dicarboxylic acid, thiodiglycolic acid, and the polyethylene-glycol-monoalkyl ether semiesters of the above dicarboxylic acids, of ketocarboxylic acids, such as β-keto-carboxylic acids, for example of acetoacetic acid, propionylacetic acid, butyrylacetic acid or caprionoylacetic acid, of amino acids, such as diethylamino acetic acid etc. Instead of carboxylic acid radicals there may be present those of sulfonic acids, such as methane-sulfonic acid or toluene-sulfonic acid, and of inorganic acids such as phosphoric acids or sulfuric acids.

From among the ether radicals there may be mentioned more especially those of lower monohydric or polyhydric aliphatic or cycloaliphatic alcohols, such as methanol, ethanol, ethylene glycols or propylene glycols, cyclohexanol, tetrahydropyranol or lower araliphatic alcohols, such as benzyl alcohol or of phenols, preferably monocyclic phenols. Among the halogen derivatives the fluorine and chlorine derivatives deserve special mention.

The products of the invention are capable of causing the elimination of sodium and can be used therapeutically for restoring a disturbed sodium balance, especially in cases of sodium retention, for example in cases of oedema or circulatory disturbances including hypertension.

To manufacture the pregnane-3β:16α-diol-20-ons one of the following variants of the process may be used:
(a) In a compound of the formula

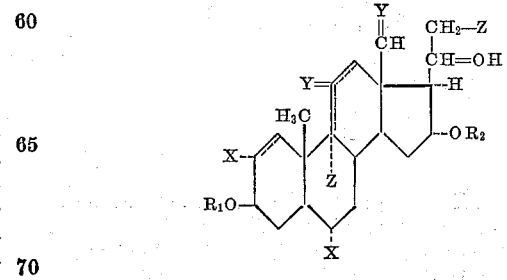

in which X, Y, Z and $R_1$ and $R_2$ have the above meanings—the 20-hydroxyl group is dehydrogenated to the oxo group; or (b) In a compound of the formula

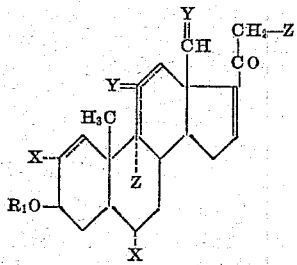

in which X, Y, Z and $R_1$ and $R_2$ have the above meanings—a 16α-hydroxyl group is introduced, accompanied by the elimination of the double bond, or (c) A compound of the formula

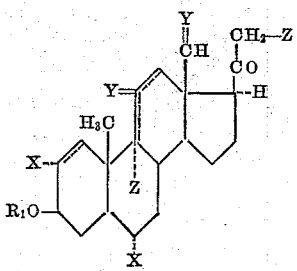

in which X, Y, Z and $R_1$ have the meanings given them above—is hydroxylated in the 16α-position by a microbiological method as such known; or (d) In a compound of the formula

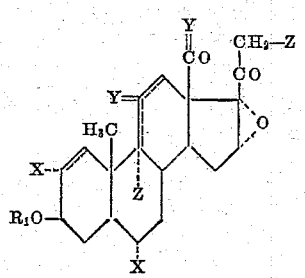

in which X, Y, Z and $R_1$ have the above meanings—the 16α:17α-epoxide is split to form a 16α-hydroxyl; or (e) In a compound of the formula

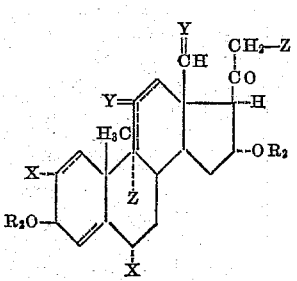

in which X, Y, Z and $R_1$ and $R_2$ have the above meanings and at least one of the substituents X, Y or Z is different from hydrogen or otherwise an additional double bond is present in the 1:2- and/or 9:11- or 11:12-position, and which contains a double bond in the 4:5- or 5:6-position the double bond in the 4:5- or 5:6-position respectively is reduced; or (f) In a compound of the formula

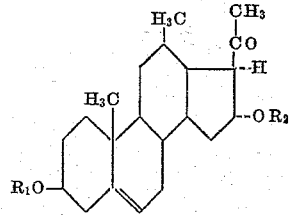

in which $R_1$ and $R_2$ represent hydrogen or an acyl or ether radical, with the proviso that, if $R_1$=acetyl, $R_2$ is not hydrogen, or an acetyl, methyl, benzyl or triphenyl-methyl radical—the 5:6-double bond is reduced; or (g) In a compound of the formula

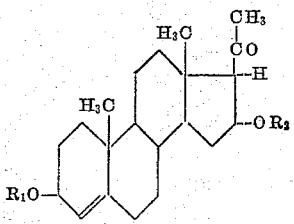

in which $R_1$ and $R_2$ represent hydrogen or an acyl or ether radical—the 4:5-double bond is reduced.

According to the process sub (a) above the starting material is dehydrogenated in the 20-position; this can be achieved by a variety of known methods, for example oxidation by means of a compound of hexavalent chromium, such as chromium trioxide in glacial acetic acid or a chromium trioxide/pyridine complex, potassium bichromate, or by means of an N-halogeno-amide or -imide, for example N-chloro-, N-bromo-, N-iodo-acetamide or -succinimide, advantageously in an alcoholic—such as a tertiary butanolic—solution.

According to the process sub (b) a 16α-hydroxyl is introduced into the starting material, accompanied by the elimination of the 16:17-double bond, for example by treatment with an aliphatic-aromatic alcohol, such as benzyl alcohol, para-methoxy-benzyl alcohol, para-tolyl-carbinol, diphenyl- or triphenylcarbinol, in a neutral medium or in the presence of an alkaline or acidic catalyst, such as a carbonate or hydroxide of an alkali metal, a mineral acid, sulfonic acid, boron trifluoride, or the like and, if desired, the resulting 16α-O-ether is split to form the 16α-ol under reducing conditions. An especially suitable reducing agent is catalytically activated hydrogen, for example in the presence of a palladium catalyst such as palladium+calcium carbonate, or a complex metal hydride, such as lithium-aluminum hydride or lithium-boron hydride. When the latter method is used, it is of advantage to protect the 20-oxo group by ketalization, for example with ethylene-, 1:2-propylene- or 1:3-propylene-glycol in the presence of an acidic catalyst such as para-toluene sulfonic acid. After the reduction the 20-ketal is split up by careful acid hydrolysis to form the 20-ketone.

According to the process sub (c) the starting material is hydroxylated by a known method in 16α-position by incubating it under aerobic conditions, for example together with living micro-organisms capable of introducing a hydroxyl group in the 16α-position. Alternatively, the enzymes can be isolated more or less extensively from the culture filtrate or from the micro-organisms, the process then being continued in the absence of living micro-organisms. The 16α-hydroxylating micro-organisms, for example strains of the Streptomyces genus e.g. *Streptomyces roseochromogenus* or the species *Didymella vodakii* or *Pestalotia funera*, are grown in a manner known per se, for example in a static or submerged and agitated culture which advantageously contains assimilable carbon, more especially a carbohydrate. The method which is simplest to perform in practice is described hereinafter without restricting the invention thereto: The organisms are grown in apparatus and under conditions similar to those known as the so-called deep-tank method in the manufacture of antibiotics. When the culture has completed its growth, the aforementioned starting material is added in the form of a fine dispersion or solution, for example in methanol, acetone or ethylene glycol, and incubation is continued. Finally, the mycelium is separated, and the filtrate and/or the mycelial mass is/are extracted. From the extract the reaction products are isolated in a manner known per se, for example by a demixing operation, adsorption, chromatography, crystallization, conversion into functional derivatives, such as Girard compounds or the like.

The splitting up of the 16α:17α-epoxide according to the process described sub (d) above can be performed in one of two ways: Either the 16α:17α-epoxide is treated with chromyl chloride or acetate, whereby the 16α-hydroxy compound is obtained directly as a result of the reductive opening up of the epoxide. Or, according to another method, the 16α:17α-epoxide is reacted with an arylhydrazine, advantageously in the presence of an acidic catalyst such as para-toluene-sulfonic acid. The $\Delta^{17(20)}$-16α-hydroxy-20-arylazo-pregnene thus formed is then reduced, for example with zinc and glacial acetic acid in a pyridinic solution to yield the 16α-hydroxy-20-arylhydrazone, and the 20-oxo group is then liberated by hydrolysis, for example with pyruvic acid and/or para-hydroxybenzaldehyde.

According to the processes sub (e), (f) and (g) above the 4:5- or 5:6-double bond respectively in the starting material is reduced, and the pregnane compound thus formed is isolated. An especially suitable reducing agent for this reaction is catalytically activated hydrogen, for example in the presence of a nickel, platinum or palladium catalyst, such as Raney nickel, platinum oxide or palladium-calcium carbonate. The reduction is conducted in a neutral medium for example in an alcohol such as methanol, ethanol or in an acidic medium such as an organic acid, e.g. glacial acetic acid while preferably protecting previously the 20-keto group. The resulting pregnane compound is separated from the hydrogenation mixture in a manner known per se, for example by a demixing operation, adsorption, chromatography or crystallization.

The starting materials for the present invention—which may contain in addition to the specified substituents a double bond in the 1:2- and/or 9:11- or 11:12-position—can be prepared by methods as such known. The starting materials used sub (c) and (d) above are accessible from the starting materials specified sub (b) by hydrogenation or epoxylation of the 16:17-double bond.

Those products of the present process which contain free hydroxyl and/or oxo groups can be converted in known manner into their functional derivatives such as esters, ethers, enol esters, enol ethers, acetals, their corresponding thio derivatives, for example thio-ether, thio-acetals or esters of thio-acids, as well as into hydrazones or oximes.

The acid radicals in the esters and enol esters are those of the acids specified hereinbefore.

In the ethers, enol ethers, acetals or their corresponding thio derivatives the radicals may belong to the aliphatic, alicyclic, araliphatic, aromatic or heterocyclic series. Such radicals are, for example, alkyl such as methyl or ethyl, or alkylene such as ethylene groups, aralkyl such as benzyl, di- or triphenyl-methyl groups or tetrahydropyranyl groups.

The esterification and acetalization is performed, for example, with a reactive ester of a suitable alcohol, more especially the esters of hydrohalic acids, organic sulfonic acids or orthoformic acid, as well as free alcohols, tetraalkyl-silicon, or the like. According to the agents used, the reaction is performed in the presence of an acidic or basic condensing agent or catalyst, for example in the presence of a sulfonic acid, mineral acid such as a hydrohalic acid or sulfuric acid, or of an organic base, more especially of a tertiary amine.

The thio-acetals and thio-enol ethers are obtained, for example, by treatment with a mercapto compound. Thioenol ethers and sulfur-acetals are advantageously prepared by reacting the acylic-acetal formed with a derivative of a heavy metal capable of forming mercaptides. Preferred mercapto compounds are alkylmercaptans, such as methyl-, ethyl- or benzyl-mercaptan or ethylene-dimercaptan, or the like, used in the presence of an acidic catalyst such, for example, as hydrochloric acid, sulfuric acid, toluene sulfonic acid, zinc chloride or pyridine hydrochloride. Heavy metal derivatives capable of forming marcaptides are more especially oxides or inorganic or organic salts, for example chlorides, nitrates, carbonates, acetates, propionates, benzoates of mercury, cadmium, silver, copper, lead, bismuth, cobalt or nickel. The reaction is advantageously performed with the exclusion of water and, if desired, in the presence of an organic or inorganic acid-acceptor such as pyridine, collidine or a carbonate, such as a carbonate of an alkali, alkaline earth or heavy metal. Alternatively, the elimination of mercaptan from the acylic thioacetal can also be achieved by the application of heat.

By suitably selecting the reaction conditions and the proportions of the reactants the hydroxyl or oxo groups present can be completely or only partially functionally converted, for example esterified or etherified.

Functionally converted hydroxyl or oxo groups in resulting compounds can be converted into free groups; in this manner it is possible to partially liberate the functionally converted groups more especially in polysubstituted derivatives, for example by chemical or enzymatic hydrolysis with the use of acidic or basic agents, by trans-esterification, re-acetalization or—more especially in the case of araliphatic acid or alcohol radicals—by hydrogenation. From oxygen-sulfur acetals the cyclic semiacetals are accessible, advantageously with the aid of heavy-metal salts such as mercuric chloride, in the presence of a basic agent such, for example, as cadmium carbonate. From the only partially converted (such as esterified) derivatives obtained in this manner or directly, polysubstituted derivatives—more especially mixed esters or ethers or ester-ethers—can be prepared by subsequent functional conversion, for example esterification or etherification. By suitably selecting the reaction conditions it is possible, with the use of the agents mentioned above, to reform the free compounds from the partially or completely converted derivatives.

The present invention also covers any variant of the process in which only some of the steps are performed, if desired in a different order of succession, or in which the starting material used is an intermediate obtained at any stage of the process and the remaining step or steps is/are performed.

The present invention further covers prepartions for use in human or veterinary medicine, said preparations containing the afore-mentioned new products of the present invention, their esters or ethers as well as a solid or liquid pharmaceutical excipient. The preparations are formulated by methods known per se, for example with the use of a pharmaceutical organic or inorganic excipient suitable for parenteral, enteral or local administration. Suitable excipients are those which do not react with the products of the present process, such, for example, as water, vegetable oils, benzyl alcohols, polyethylene glycols, gelatine, lactose, starch, magnesium stearate, talc, white petroleum jelly, cholesterol or other pharmecutical excipients. Especially advantageous is the manufacture of preparations for parenteral administration, preferably solutions, above all oily or aqueous solutions, furthermore suspensions, emulsions or implantation tablets; for enteral administration there are also made tablets or dragees, and for local application also ointments or creams. The preparations may be sterilized or contain additives such as preservatives, stabilizers, wetting agents or emulsifiers, salts for varying the osmotic pressure, or buffers.

The following examples illustrate the invention.

Example 1

A solution of 500 mg. of 16α:17α-epoxy-allopregnane-3β-ol-20-on-3β-monobenzoate in 30 cc. of glacial acetic acid is mixed with a suspension of 15 equivalents of chromous acetate in 30 cc. of water, and the mixture is shaken in an evacuated flask for 15 hours at 20° C. The contents of the flask are then poured into 200 cc. of water and the solution thus obtained is exhaustively extracted with a 3:1-mixture of ether and chloroform. The extract is dried, the solvent distilled off, and the crystalline residue is recrytallized from acetone-ether to yield pure allopregnane-3β:16α-diol-20-on-3β-monobenzoate.

The starting material is obtained by benzoylating 16α:17α-epoxy-allopregnane-3β-ol-20-on with benzoyl chloride in pyridine.

Example 2

500 mg. of 16α:17α-epoxy-allopregnane-3β-ol-20-on in 5 ml. of pyridine is heated to 40° C. with 4 ml. of trimethylacetic acid chloride and then allowed to stand for 60 hours at 20° C. After evaporation under reduced pressure, some water is added and the reaction mass extracted with ether, the ethereal solution washed neutral with water, and the solvent distilled off. The residue is dissolved in 50 ml. of glacial acetic acid, and agitated for 16 hours under petroleum ether with a suspension of 10 equivalents of chromous acetate in 20 ml. of water at 20° C. The whole is then poured into 400 ml. of water, air is passed through the mixture until all of the chromium salt is oxidized, and this operation is followed by three extractions with 200 ml. of chloroform each. The reaction mass is washed neutral with 0.1 N-hydrochloric acid, water 2 N-sodium carbonate solution and water, then dried over sodium sulfate and distilled. The residue is taken up in benzene and chromatographed over neutral alumina of activity I. From the fractions 9-14, eluated with benzene/ether 9:1 and ether, there is obtained on recrystallization from a mixture of acetone and ether the allopregnane-3β,16α-diol-20-on-3-trimethyl acetate of melting point 194-198° C.

Example 3

A solution of 11 mg. of chromium trioxide in 0.6 cc. of glacial acetic acid of 95% strength is added while cooling with water to a solution of 254 mg. of allopregnane-3β:16α:20β-triol-3β:16α-diacetate in 1 cc. of glacial acetic acid. The mixture is kept for 4 hours at room temperature, poured into water and repeatedly extracted with ether. The ethereal solutions are washed with water, N-sodium bicarbonate solution and water, dried and evaporated under reduced pressure. The residue is recrystallized from a mixture of acetone, ether and petroleum ether to yield 11 mg. of allopregnane-3β:16α-diol-20-on-3β:16α-diacetate. For further purification it is dissolved in a small quantity of acetone, decolorized with carboraffin, the bulk of the acetone is expelled by evaporation with ether, and petroleum ether is added, whereupon crystallization sets in. The resulting allopregnane-3β:16α-diol-20-on-3β:16α-diacetate melts at 175-177° C.

Example 4

A solution of 600 mg. of 16α:17α-epoxy-allopregnane-3β-ol-11:20-dion in 30 cc. of glacial acetic acid is shaken with a suspension of 20 equivalent of chromous acetate in 30 cc. of water for 16 hours at 20° C. in an evacuated flask. The mixture is then poured into 200 cc. of water and extracted three times with 150 cc. of chloroform, and this solution is washed with dilute hydrochloric acid, dilute sodium carbonate solution and then with water until neutral, dried over sodium sulfate, and the solvent is distilled off in vacuo. The residue is recrystallized from methanol-water to yield allopregnane-3β:16α-diol-11:20-dion in fine plates melting at 246-248° C.

Example 5

80 mg. of Δ⁵-pregnane-3β:16α-diol-20-on in 20 cc. of ethanol of 95% strength are hydrogenated with 40 mg. of a palladium+calcium carbonate catalyst (containing 10% of palladium) at 20° C. until 1 molecular equivalent of hydrogen has been absorbed. The solution is filtered, evaporated under reduced pressure, and the residue is recrystallized from methanol to yield allopregnane-3β:16α-diol-20-on melting at 258-260° C. From the mother liquor, the pregnane-3β:16α-diol-20-on of melting point 198-199° C. is obtained by fractional crystallization.

Example 6

40 mg. of Δ⁴-pregnene-3β:16α-diol-20-on in 10 cc. of ethanol of 95% strength are hydrogenated with 20 mg. of palladium+calcium carbonate catalyst (containing 10% of palladium) at 20° C. under a slightly raised pressure until 1 molecular equivalent of hydrogen has been taken up. The solution is filtered and evaporated in vacuo. On recrystallization from methanol the residue yields allopregnane-3β:16α-diol-20-on melting at 258-260° C. From the mother liquor there is obtained the pregnane-3β:16α-diol-20-on of melting point 198-199° C.

The starting material can be prepared, for example, by converting 16α-hydroxy-progesterone into its 20-monoketal, reducing the 3-oxo group with the aid of sodium-boron hydride, and ketal cleavage.

Example 7

A solution of 80 mg. of 16α:17α-epoxy-allopregnane-3β-ol-20-on-3β-monoacetate in 12 cc. of glacial acetic acid is shaken with a suspension of 20 equivalents of chromous acetate in 4 cc. of water in an evacuated flask for 8 hours at 20° C. The mixture is then poured into 30 cc. of water and extracted three times with 20 cc. of a 3:1-mixture of ether and chloroform, washed with dilute hydrochloric acid, dilute sodium bicarbonate solution and with water until neutral, dried, and then evaporated in vacuo. The residue is chromatographed over 4 grams of silica gel (containing 15% of water) prepared in benzene. The fractions eluted with chloroform-acetone mixtures 95:5, 90:10, 5:5, and with acetone are combined and recrystallized from acetone to yield allopregnane-3β:16α-diol-20-on-3β-monoacetate melting at 183-185° C.

Example 8

A solution of 1 gram of 16α:17α-epoxy-allopregnane-3β-ol-20-on in 80 cc. of glacial acetic acid is shaken with a suspension of 15 equivalents of chromous acetate in 55 cc. of water in an evacuated flask for 4 hours at 30° C. The mixture is then poured into 200 cc. of water and extracted three times with 200 cc. of chloroform. The solution is washed with dilute hydrochloric acid, dilute sodium carbonate solution and with water until neutral, dried over sodium sulfate and evaporated under reduced pressure, the residue being taken up in a 1:1-mixture of methanol and chloroform. The latter solution is evaporated to one-fifth of its volume; the crystalline precipitate is diluted wtih acetone, suction-filtered and thoroughly washed on the filter with acetone to yield allopregnane-3β:16α-diol-20-on melting at 250-254° C., and, after a further crystallization from methanol, at 258-260° C.

Example 9

Four 500 cc. Erlenmeyer flasks are each charged with 100 cc. of a nutrient solution containing per liter of tap water the following additives: 10 grams of crude glucose, 5 grams of peptone, 3 grams of meat extract (Oxo Lab Lemco), 5 grams of sodium chloride and 10 grams of calcium carbonate. The flasks are sterilized in an autoclave and then inoculated with Streptomyces sp. A–7747. The cultures are shaken mechanically at 26° C. and develop well within 26 hours. To each culture there is added under sterile conditions a solution of 30 mg. of allopregnane-3β-ol-20-on in 1 cc. of acetone, and the cultures are then shaken for a further 48 hours at 26° C.; the mycelium is removed and the combined culture filtrate is extracted three times with 100 cc. of ethyl acetate. The extracts are washed with a small quantity of water, combined, dried over sodium sulfate, and evaporated in vacuo. The paper-chromatographic examination of the residue obtained (145 mg.) discloses that it contains in addition to starting material and some by-products predominantly allopregnane-3β:16α-diol-20-on as well as another substance. These compounds can be isolated in pure form by preparative paper-chromatography (system propylene glycol/toluene). Allopregnane-3β:16α-diol-20-on crystallizes from methanol in flakes melting at 258–260° C.

When instead of allopregnane-3β-ol-20-on there is incubated the 5β-isomer, the end product is pregnane-3β:16α-diol-20-on of melting point 198–199° C.

Example 10

In four 500 cc. Erlenmeyer flasks 100 cc. each of the nutrient solution defined in Example 9 are sterilized and inoculated with *Streptomyces roseochromogenus*. The flasks are shaken for 2 days at 26° C., and a solution of 30 mg. each of allopregnane-3β-ol-20-on-3β-acetate in 0.5 cc. of acetone is added under sterile conditions to the well-developed cultures, and shaking is then continued for another 48 hours at the same temperature. The extraction residue obtained as described in Example 9 contains in addition to allopregnane-3β-ol-20-on and some by-products predominantly allopregnane-3β:16α-diol-20-on as well as another substance. Separation to yield the pure substances is performed by way of preparative paper-chromatography with the system propylene glycol/toluene. On recrystallization from methanol allopregnane-3β:16α-diol-20-on melts at 258–260° C.

Example 11

100 cc. of beer wort each are sterilized in three 500 cc. Erlenmeyer flasks and then inoculated with *Pestalotia funera*. The flasks are shaken at 25° C., whereupon the cultures develop well within 2 days. A solution of 30 mg. of allopregnane-3β-ol-11:20-dion in 1 cc. of acetone is added under sterile conditions to each flask and shaking is continued for a further 48 hours at the same temperature. The extraction residue obtained as described in Example 9 is subjected to preparative paper-chromatography (system formamide/benzene) to yield pure allopregnane-3β:16α-diol-11:20-dion.

Example 12

100 cc. each of a nutrient solution containing the following additives per liter of tap water: 50 grams of crude glucose, 1 gram of yeast extract, 2.6 grams of tartaric acid, 2.6 grams of ammonium tartrate, 0.17 gram of ammonium sulfate, 0.4 gram of secondary ammonium phosphate, 0.4 gram of potassium carbonate and 0.27 gram of magnesium carbonate, are sterilized in four 500 cc. Erlenmeyer flasks. The solutions are inoculated with *Didymella vodakii* and shaken for 3 days at 26° C. To each of the well-developed cultures is then added under sterile conditions a solution of 30 mg. of allopregnane-3β:11β:diol-20-on in 0.5 cc. of acetone, and shaking is continued for a further 48 hours at the same temperature. The extraction residue obtained according to Example 9 contains in addition to allopregnane-3β:11β:diol-20-on and some by-products predominantly allopregnane-3β:11β:16α-triol-20-on. By preparative paper-chromatography (system formamide/chloroform) it is obtained in the pure form melting at 257–260° C.

Example 13

As described in Example 9 four cultures of Streptomyces sp. A–7747 each in 100 cc. nutrient solution are prepared. To each one there is added under sterile conditions a solution of 30 mg. of Δ$^{9,11}$-allopregnene-3β-ol-20-on-3β-acetate in 0.5 cc. of acetone. The cultures are shaken for 36 hours at 26° C. and then worked up as described in Example 9. In addition to Δ$^{9,11}$-allo-pregnene-3β-ol-20-on and some by-products the extraction residue contains predominantly Δ$^{9,11}$-allopregnene-3β:16α-diol-20-on which is isolated in the pure form by preparative paper-chromatography (system propylene glycol/toluene).

Example 14

To four cultures of 100 cc. each of Streptomyces sp. A–7747 (prepared as described in Example 9) there is added under sterile conditions a solution of 30 mg. each of 9α-fluoro-allopregnane-3β:11β-diol-20-on in 0.5 cc. of methanol. The cultures are shaken for 36 hours at 26° C. and then worked up as described in Example 9. In addition to 9α-fluoro-allopregnane-3β:11β-diol-20-on and a few by-products the extraction residue consists predominantly of 9α-fluoro-allopregnane-3β:11β:16α-triol-20-on which can be isolated in the pure form by preparative paper-chromatography (system formamide/chloroform).

The starting material can be prepared in known manner from Δ$^{9,11}$-allopregnene-3β-ol-20-on by addition of HOBr, splitting off of HBr to yield 9β:11β-epoxy-allopregnane-3β-ol-20-on and cleavage of the epoxide by means of hydrofluoric acid.

Example 15

A solution of 100 mg. of Δ$^{16}$-allopregnene-3β-ol-20-on in 50 cc. of chloroform free from alcohol is mixed with 50 mg. of diphenyl carbinol and 30 mg. of anhydrous, finely ground calcium sulfate, and the mixture is stirred for 24 hours at 20° C. in the presence of a catalytic quantity of hydrochloric gas. The calcium sulfate is then suctioned off, the solution is washed with water, dried, and evaporated under reduced pressure. The residue is chromatographed over 3 grams of alumina. The eluates obtained with benzene/ether and with ether yield 16α-diphenylmethoxy-allopregnane-3β-ol-20-on.

By using in the above example 4 grams of para-methoxy-benzyl alcohol instead of diphenyl carbinol and working up there is obtained 16α-para-methoxybenzyl-allopregnane-3β-ol-20-on.

By proceeding in similar manner with the use of Δ$^{16}$-allopregnene-3β-ol-11:20-dion as starting material, 16α-diphenyl-methoxy- or 16α-para-methoxy-benzyloxy-allopregnane-3β-ol-11:20-dion respectively is obtained.

The hydrogenating cleavage of the 16-ethers can be carried out, for example, in the following manner:

A solution of 100 mg. of 16α-para-methoxy-benzyloxy-allopregnane-3β-ol-20-on in 20 cc. of ethyl acetate is mixed with 50 mg. of palladium+calcium carbonate catalyst (containing 10% of palladium), and the whole is hydrogenated until 1 molecular equivalent of hydrogen has been taken up. The catalyst is filtered off, and the filtrate is evaporated to yield allopregnane-3β:16α-diol-20-on which melts at 258–260° C. after having been recrystallized from methanol.

Example 16

500 mg. of 16α:17α-epoxy-pregnane-3β-ol-20-on are dissolved in 30 ml. of glacial acetic acid, mixed with a suspension of 15 equivalents of chromous acetate in 30 ml. of water and, after reducing the pressure in the vessel, agitated at 20° C. for 15 hours. The contents of the flask are poured into 200 ml. of water, and the latter exhaustively extracted with a 3:1 mixture of ether and chloroform. On distilling off the solvent a crystalline residue is obtained which on recrystallization from a mixture of acetone and ether yields pure pregnane-3β:16α-diol-20-on of melting point 198–199° C., $[\alpha]_D = +53°$ (methanol-chloroform 1:1).

The 16α:17α-epoxy-pregnane-3β-ol-20-on used as starting material can be obtained by the degradation of sarsasapogenin acetate to Δ¹⁶-pregnene-3β-ol-20-on-3β acetate, followed by epoxylation in 16:17-position and hydrolysis of the latter compound.

What is claimed is:

1. A member selected from the group consisting of a compound of the formula

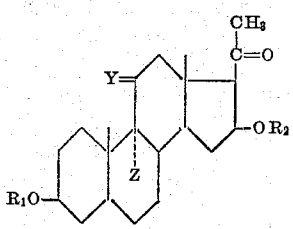

in which Y stands for a member selected from the group consisting of hydroxyl group with a hydrogen atom, acyloxy with a hydrogen atom, and oxo, Z for a member selected from the group consisting of hydrogen and halogen, $R_1$ and $R_2$ each for a member selected from the group consisting of hydrogen and acyl, acyl in the above expressions representing the acyl radical of an acid selected from the group consisting of organic carboxylic acids containing up to 18 carbon atoms, organic sulfonic acids containing up to 7 carbon atoms, sulfuric acids and phosphoric acids, and the corresponding compounds, which have a double bond in the 9,11-position and a hydrogen atom in the 11-position.

2. Allopregnane-3β:11β:16α-triol-20-on.
3. Δ⁹⁽¹¹⁾-Allopregnene-3β:16α-diol-20-on.
4. Allopregnane-3β:11β:16α-triol-9α-fluoro-20-on.
5. Allopregnane-3β:16α-diol-11:20-dion.
6. Pregnane-3β:16α-diol-20-on.
7. A pharmaceutical composition comprising a compound as claimed in claim 1 in an amount ranging from 0.001 to 10% and a pharmaceutical carrier.

References Cited in the file of this patent
UNITED STATES PATENTS

| | | |
|---|---|---|
| 2,727,909 | Colton | Dec. 20, 1955 |
| 2,782,193 | Djerassi et al. | Feb. 19, 1957 |
| 2,855,410 | Fried et al. | Oct. 7, 1958 |
| 2,901,492 | Herz et al. | Aug. 25, 1959 |

OTHER REFERENCES

Fukushima et al.: J.A.C.S., vol. 73, pages 196–201 (1951).
Wettstein et al.: Helv. Chim. Acta, vol. 42, pages 956–971.
Neher et al.: Helv. Chim. Acta, vol. 42, pages 132–152.
Hirschmann et al.: J. Org. Chem., vol. 20, pages 572–86 (1955).
Schwarz et al.: Coll. Czech Chem. Comm., vol. 23, pages 940–5 (May 1958).

UNITED STATES PATENT OFFICE
CERTIFICATE OF CORRECTION

Patent No. 3,033,748                              May 8, 1962

Albert Wettstein et al.

It is hereby certified that error appears in the above numbered patent requiring correction and that the said Letters Patent should read as corrected below.

Column 2, lines 58 to 70, the upper right-hand portion of the formula should appear as shown below instead of as in the patent:

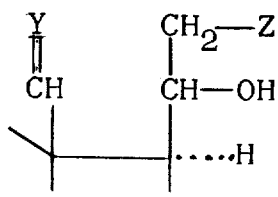

Column 3, lines 57 to 70, the lower left-hand portion of the formula should appear as shown below instead of as in the patent:

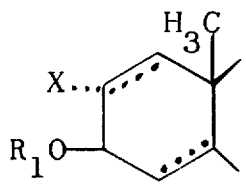

Column 6, lines 42 and 43, for "(such as esterified)" read -- such as esterified or etherified) --; column 7, line 39, after water", first occurrence, insert a comma.

Signed and sealed this 13th day of August 1963.

(SEAL)
Attest:

ERNEST W. SWIDER
Attesting Officer

DAVID L. LADD
Commissioner of patents